(12) United States Patent
Sarhadiangardabad

(10) Patent No.: US 9,932,074 B2
(45) Date of Patent: Apr. 3, 2018

(54) ACTIVE VEHICLE SKIRT PANEL AND THE METHOD OF CONTROLLING THE SAME

(71) Applicant: Faraday & Future Inc., Gardena, CA (US)

(72) Inventor: Ara Sarhadiangardabad, Irvine, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 214 days.

(21) Appl. No.: 14/840,912

(22) Filed: Aug. 31, 2015

(65) Prior Publication Data

US 2017/0057565 A1    Mar. 2, 2017

(51) Int. Cl.
*B62D 35/02* (2006.01)
*B62D 37/02* (2006.01)

(52) U.S. Cl.
CPC ............ *B62D 35/02* (2013.01); *B62D 37/02* (2013.01); *Y02T 10/88* (2013.01)

(58) Field of Classification Search
None
See application file for complete search history.

(56) References Cited

U.S. PATENT DOCUMENTS

| | | | | |
|---|---|---|---|---|
| 8,979,102 | B1 * | 3/2015 | Prentice | B62D 35/00 280/124.1 |
| 2008/0252099 | A1 * | 10/2008 | Terry | B62D 35/02 296/181.5 |
| 2011/0148142 | A1 * | 6/2011 | Kint | B62D 35/02 296/180.4 |
| 2013/0059519 | A1 * | 3/2013 | Tajima | B60K 11/04 454/152 |
| 2013/0257093 | A1 * | 10/2013 | del Gaizo | B62D 35/02 296/180.5 |
| 2013/0278011 | A1 * | 10/2013 | Matsuyama | B62D 35/02 296/180.2 |
| 2014/0288788 | A1 * | 9/2014 | Hayakawa | B60K 11/085 701/49 |
| 2015/0008698 | A1 * | 1/2015 | Reisenhofer | B62D 25/20 296/180.1 |
| 2015/0021111 | A1 * | 1/2015 | Hillstroem | B60K 13/04 180/89.2 |
| 2016/0272257 | A1 * | 9/2016 | McKillen | B62D 35/005 |
| 2016/0368545 | A1 * | 12/2016 | Vogel | B62D 35/001 |

* cited by examiner

*Primary Examiner* — James M McPherson
(74) *Attorney, Agent, or Firm* — Finnegan, Henderson, Farabow, Garrett & Dunner, LLP

(57) ABSTRACT

An active vehicle ground effect system having at least one guiding piece coupled to an undercarriage of a vehicle, where the at least one guiding piece has a configuration to guide an airflow between the undercarriage of the vehicle and a ground while the vehicle is moving. The active vehicle ground effect system has an actuator coupled to the at least one guiding piece. The system has a controller configured to activate the at least one guiding piece from a first position to a second position when an activating condition is met. When a deactivating condition is met, the controller deactivates the at least one guiding piece by moving the at least one guiding piece from the second position to the first position.

18 Claims, 9 Drawing Sheets

ACTIVE VEHICLE SKIRT PANEL AND THE METHOD OF CONTROLLING THE SAME

FIELD OF THE DISCLOSURE

The field of the disclosure is vehicle aerodynamics in general and active vehicle skirt panel specifically.

BACKGROUND

Aerodynamics can play an important role in a ground vehicle's dynamic behavior at speed. Positive aerodynamic lift is generally undesirable because the corresponding reduction in traction to the tire(s) can be reduced below the levels required for safe cornering, braking, or acceleration. To counteract such tendencies, a number of aerodynamic elements such as spoilers or wings are known to create negative lift, or downforce, to increase the vehicle's limit of adhesion.

However, in many applications, spoilers or wings placed above the vehicle to create downforce have a notable drag penalty expressed as a lift-to-drag (L/D) ratio. This means with increasing downforce from the addition of or increasing angle-of-attack (AoA) of a wing, there is a corresponding increase in power required to maintain speed or acceleration rate as well as increase in fuel consumption. There is a continuing need for new ways to modulate ground vehicle aerodynamics.

BRIEF SUMMARY

The present disclosure is an active vehicle ground effect system disposed on the undercarriage of a vehicle and becomes active when the vehicle is in motion. Once active, the active vehicle ground effect system guides undercarriage airflow between the underside of the vehicle and the ground. Contemplated aspects of the disclosure includes a method to increase downforce by creating a suction effect below the vehicle using the same Bernoulli principle that wings and spoilers depend on, which supports the fact that the increase in the speed of air flowing through a contraction is correlated with a simultaneous decrease in pressure. The decreased pressure acting along the underbody works to pull the vehicle to the ground and to increase tire traction. By utilizing moving and/or non-moving parts, all of which are located on the underside of the vehicle, the active vehicle ground effect system creates a Venturi effect as airflow passes through.

One object of this disclosure is to improve tire traction.

Another object of this disclosure is to improve tire traction discreetly, without using a spoiler or typical ground effect that is visible when the vehicle is not in motion.

Yet another object of this disclosure is to improve handling and cornering of a vehicle by using an active ground effect system that adjusts the center of downforce based on various factors and conditions.

In an embodiment, the active vehicle ground effect system is capable of guiding airflow between an undercarriage of a vehicle and the ground while the vehicle is moving across the ground. In one embodiment, the system has at least one guiding piece coupled to the undercarriage of the vehicle, and this guiding piece is movable by an actuator that is coupled to this guiding piece. The system also has a controller to activate the at least one guiding piece by activating the actuator to pivot and/or extend the guiding piece away from the undercarriage of the vehicle when an activating condition is met.

In one embodiment, the controller deactivates the guiding piece by using the actuator to retract or pivot the guiding piece toward the undercarriage of the vehicle and away from the ground, when a certain deactivating condition is met.

In one generalized embodiment, either all or a majority portion of each guiding piece can be disposed in the undercarriage between a front axle and a rear axle of the vehicle.

The contemplated active vehicle ground effect system, when activated, can have a configuration or outer contour to create a Venturi effect by providing a converging section, a throat section, and a diverging section for the airflow that passes through the undercarriage.

Various conditions are contemplated to activate the active vehicle ground effect system. For example, one activating condition includes when the vehicle travels at or above an activating threshold velocity. On the other hand, a deactivation condition can include when the vehicle travels at or below a deactivating threshold velocity.

In another example, the system may deactivate when the vehicle detects oncoming road condition/obstacles that may directly collide with any of the guiding pieces. In such a situation, actuators would retract guiding pieces away from the ground. The vehicle can detect these oncoming road conditions by using appropriate sensors or terrain-reading cameras.

There can be many possibilities for what the guiding pieces are comprised of. In one embodiment, they are two side skirts: a driver-side skirt coupled to the undercarriage of the vehicle and oriented lengthwise in relation to the vehicle, and a passenger-side skirt coupled to the undercarriage of the vehicle and oriented lengthwise in relation to the vehicle.

In other contemplated embodiments, there can be more than two side skirts.

In most embodiments, these side skirts each of which has an arc-shaped inner-facing wall to converge the airflow toward a center longitudinal axis of the airflow, thereby narrowing a width of the airflow at the throat section as the airflow passes between the front axle and a rear axle.

In some embodiments, the inner-facing walls of these side skirts, when activated, optionally provide a widened width for airflow (when compared to the throat section) in a diverging section located downstream of the throat section.

In other embodiments of the subject disclosure, variously lateral locations for these side skirts are considered in view of the undercarriage aerodynamics influenced by the wheels of the vehicle. In one embodiment, these skirts are disposed at or inboard to the most inboard extent of a front wheel well and a rear wheel well. In another embodiment, these skirts are disposed outboard just below a rocker panel of the vehicle.

Guiding pieces can also include an underbody panel disposed between the front axle and the rear axle. In one embodiment, this panel covers a substantial area of the undercarriage between the front axle and the rear axle. This panel can have a gradual downward contour to lower the height of airflow passing thereunder, thereby also creating a throat section of airflow. In an alternative embodiment, this panel can have two arc-shaped side walls.

The contemplated underbody panel can be a battery cover or an outer casing of an undercarriage-mounted battery. Also contemplated is for the underbody panel to be pivotable and/or retractable, being controlled by the controller based on the activating and deactivating conditions discussed elsewhere in this application.

Further contemplated embodiments can have a single-body panel that combines the effect of side skirts with an underbody panel. This single-body embodiment can include a contour that resembles two side skirts and a downward sloping arc inbetween the two side skirts, which creates the Venturi effect to constrict both height and width of the airflow.

Alternatively, the single-body panel can have a contour of half of an hour glass, sliced through in a vertical direction.

While most of the embodiments describe one or more guiding pieces that are movable, it should be especially noted that some embodiments specifically require guiding pieces that are stationary and not movable and not controllable by actuators. For example, while the side skirts are movable, the underbody panel disposed inbetween the side skirts can be non-movable by actuators.

Various objects, features, aspects and advantages of the present disclosure will become more apparent from the following detailed description of various embodiments of the disclosure, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as top, bottom, left, right, up, down, over, above, below, beneath, rear, front, distal, and proximal are used with respect to the accompanying drawings. Such directional terms should not be construed to limit the scope of the disclosure in any manner.

DETAILED DESCRIPTION

The present disclosure is a ground effect system designed to actively modulate undercarriage or underbody airflow such that aerodynamic downforce and tire traction are enhanced. In one aspect of an embodiment, active control of front-to-rear aerodynamic tire loading balance can be provided. In another embodiment, the system can enhance downforce and tire traction by locally reducing the flow area and increasing velocity at some point along the streamwise direction, like a Venturi.

Different aspects of undercarriage flow modulation that the current disclosure addresses include at least: local pressure reduction, flow isolation, and vortex generation. Active side skirts, which are side skirts that can change shape and/or retract/extend, can play a role in these aspects.

The specification of the present disclosure treats air as the working fluid since that is the typical medium of road vehicles. However, this does not restrict nor imply the disclosure and its embodiments to only work with air.

As used herein, the terms "retracted" and/or "retractable" in conjunction with the ability for an airflow guiding piece to move, refer to a motion of retrieving the guiding piece back toward the vehicle's undercarriage, as opposed to moving away from the vehicle and toward the ground. It should be noted that these terms do not define how the guiding pieces are retrieved, and they do not define in what direction the guiding pieces are retrieved. For example, to "retract" a side skirt, the motion can include pivoting the side skirt in almost a rotating action along a longitudinal side of the side skirt. And to "retract" a side skirt can also include the motion of lifting the side skirt in a vertical direction toward the undercarriage without rotating the side skirt along its longitudinal side.

As used herein, the term "vehicle" refers to any land vehicle, motorized, electric, and hybrid. It also includes all vehicle types, including sedans, sports cars, station wagons, sport utility vehicles, trucks, vans, and tractor trailers.

Figure 1:
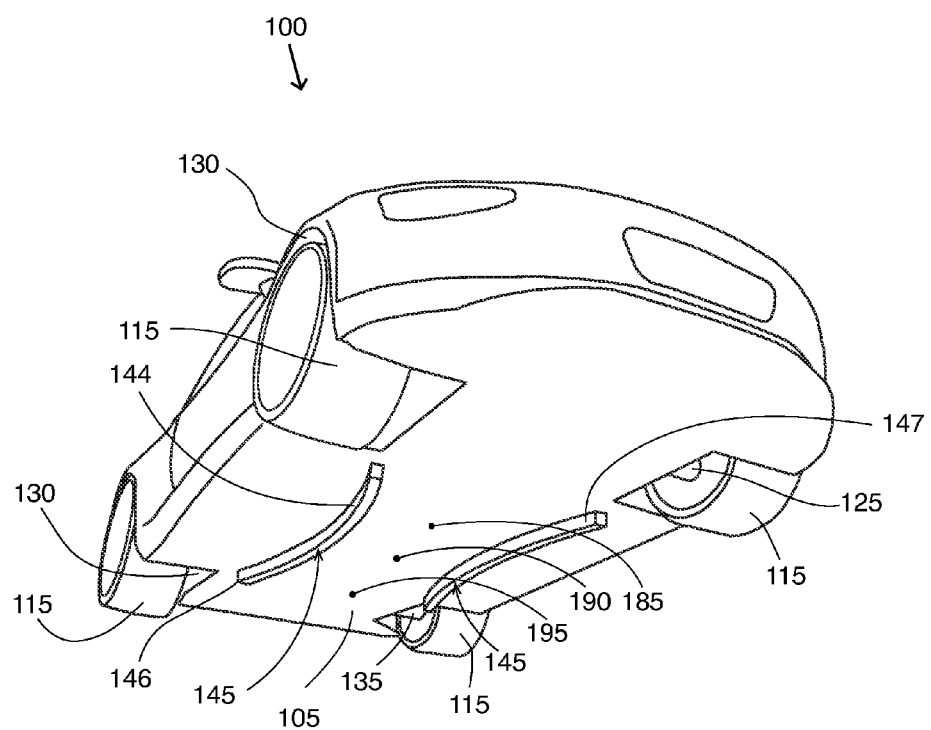
FIG. 1 is a bottom front perspective view of a vehicle's undercarriage having a pair of retractable side skirts in accordance with an embodiment of the disclosure.

FIG. 1 shows the front end of the undercarriage 105 of a vehicle 100 having four tires 115 in one embodiment of the disclosure. Vehicle 100 can have a pair of side skirts 145 located between a front axle 125 and a rear axle 135, where the front/upstream end 144 of each side skirt 145, and rear/downstream ends 146 of side skirts 135 can be mounted inboard near the inboard location of the tire/wheel well 130. These skirts 145 can have strake-like structures that create a guided flow channel for airflow travelling in between the driver-side skirt 145 and the passenger-side skirt 145. In this particular embodiment, the skirts 145 have inner-facing walls 147 having an arc shape to form a converging section 185, a throat section 190 (or point of locally minimum area of airflow), and diverging section 195. As the air flows pass the undercarriage 105, the air can undergo changes in velocity and static pressure.

The velocity increases in the converging section 185 with corresponding reduction in pressure. The highest velocity and lowest pressure can be achieved at the throat section 190. As the air flows through the diverging section 195, the pressure can go up with a corresponding reduction in flow velocity.

As will be discussed in more detail later, these side skirts 145 can extend and/or pivot to expose themselves into the air stream, thus creating the desired Venturi effect. And when deactivating conditions are met, these side skirts 145 can retract back into the undercarriage 105 of the vehicle 100.

As will be referred to throughout the specification, various embodiments of the disclosure can allow a controller to activate at least one airflow guiding piece when an activating condition is detected or met. The activating condition can include at least one from the following: speed/velocity the vehicle is traveling, weather condition, road condition, weight distribution due to passengers or cargo, or tire traction.

With respect to speed/velocity the vehicle is traveling, the guiding piece can be activated when the speed is at or above 45 miles per hour; when the speed is at or above 55 miles per hour; or when the speed is at or above 65 miles per house.

Also with respect to speed/velocity the vehicle is traveling, the guiding piece can be activated when the speed is at or above 60 kilometer per hour; when the speed is at or above 75 kilometer per hour; when the speed is at or above 90 kilometer per hour; or when the speed is at or above 100 kilometer per hour.

With respect to weather condition, the guiding piece can be activated when there is precipitation.

With respect to road condition, the guiding piece can be activated when the road is determined to be slippery.

With respect to weight distribution, the guiding piece can be activated when an unbalanced or unsafe weight distribution is detected.

With respect to tire traction, the guiding piece can be activated when the vehicle detects tire slippage.

In further contemplated embodiments, the shape of the skirts 145 and/or the location of the throat section 190 can be controlled such that the pressure distribution and relative center of minimum pressure can shift fore and aft along the vehicle's longitudinal centerline, and thus the front-to-rear aerodynamic balance is actively controlled in addition to the degree of induced vehicle downforce. In one embodiment, skirts 145 are made of pliable material so while the relative location of skirts 145 remains the same, the curvature of the arc or location of the arc along the longitudinal length of the skirts 145 can change in response to actuators (not shown) or other moving frames (not shown) underlying the skirts 145. In another embodiment, the curvature of the skirts 145 do not change, and the skirt 145 can entirely move forward (not shown) or rearward (not shown), which in effect shifts the throat section 190 fore and aft.

Figure 2:
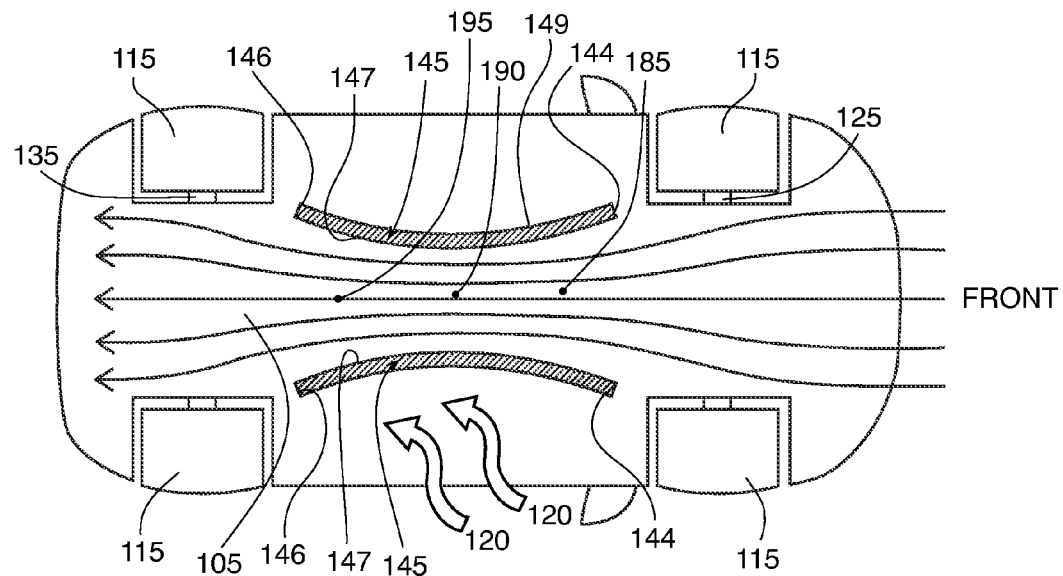
FIG. 2 is a bottom view of the vehicle of FIG. 1.

FIG. 2 represents the same embodiment as shown in FIG. 1. The front ends 144 and back ends 146 of the two skirts 145 can be placed on the undercarriage 105 inboard from the vehicle's lateral extent and approximately along the inner portion of the wheel wells 130 housing the tires 115 between the front axle 125 and rear axle 135. In other words, the active side skirts 145 can be parallel to each other and can be mounted inboard of the wheel wells 130.

With lower undercarriage pressure, there is an increasing tendency of unwanted higher pressure air 120 to flow into and under the vehicle 100 from around the vehicle's two sides to equilibrate pressure. This phenomenon works to temper the undercarriage pressure-reduction and downforce enhancement. Therefore, to complement effects of the aforementioned flow modulation mechanism, the side skirts 145 can also play a role of mitigating leakage of higher pressure airflow 120 going around the sides of the vehicle 100 into the lower-pressure undercarriage 105 airflow.

One aspect of the disclosed system is to provide side skirts 145 that can be hidden from view unless the vehicle 100 is traveling at or above a threshold activating velocity. Another aspect of the disclosed system is to provide retractable side skirts in response to uneven road surfaces.

Also, some sports cars are known to have permanent stationary side skirts that extend further out laterally from the sports car's rocker panel, making ingress/egress relatively difficult without inadvertently stepping on the side skirts. Therefore, another aspect of the disclosure is to have side skirts 145 that can be retracted (automatically or selectively controlled) when the vehicle 100 is not moving to facilitate ingress/egress. Retracted side skirts 145 may also prevent or minimize inadvertent damage of the side skirts 145 by tow trucks, jacks, jack stands, lifts, speed bumps, and pot holes.

Although side skirts 145 of the strake-like structure have been discussed thus far, one of ordinary skill in the art would immediately appreciate that side skirts 145 can have other sizes, thicknesses, and outer-facing and inner-facing contours. In some embodiments, these side skirts 145 can have inner-facing walls 147 of a contour to create the Venturi effect as discussed herein. As will be discussed later, some side skirts can be substantially straight without any arc-shaped surfaces.

Figure 3:
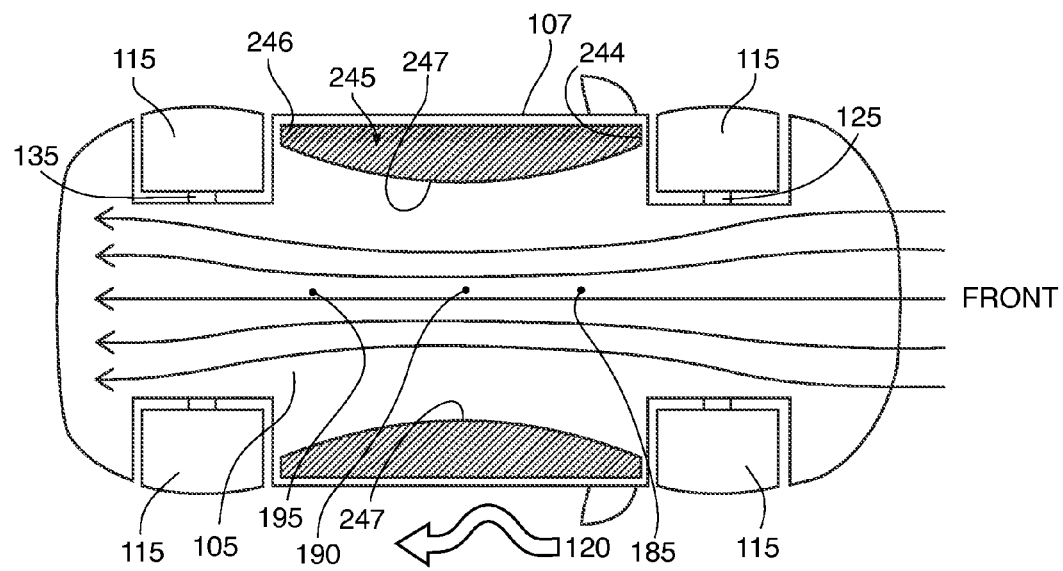
FIG. 3 is a bottom view of another vehicle implementing a pair of retractable side skirts in accordance with another embodiment of the disclosure.

FIG. 3 illustrates another embodiment of vehicle 100 where the side skirts 245 can be disposed further apart from each other, in contrast to the side skirts 145 in the embodiment of FIG. 2. In FIG. 3, side skirts 245 can be outboard placed, directly below the rocker panel 107.

As discussed above, there is a tendency of unwanted higher pressure air 120 flowing into and under the vehicle 100 from around the vehicle's two sides to equilibrate pressure. Side skirts 245, being directly below the rocker panel 107, can block higher pressure air 120 from entering into and under the vehicle 100 from around the two sides.

Similar to the embodiment of FIG. 2, side skirts 245 can have inner-facing walls 247 forming an arc, effectively creating a Venturi having converging section 185, throat section 190, and diverging section 195. The five streaks of arrows shown moving from the front of the vehicle to the rear of the vehicle represent the passage of air between the undercarriage 105 and the ground.

Figure 4:
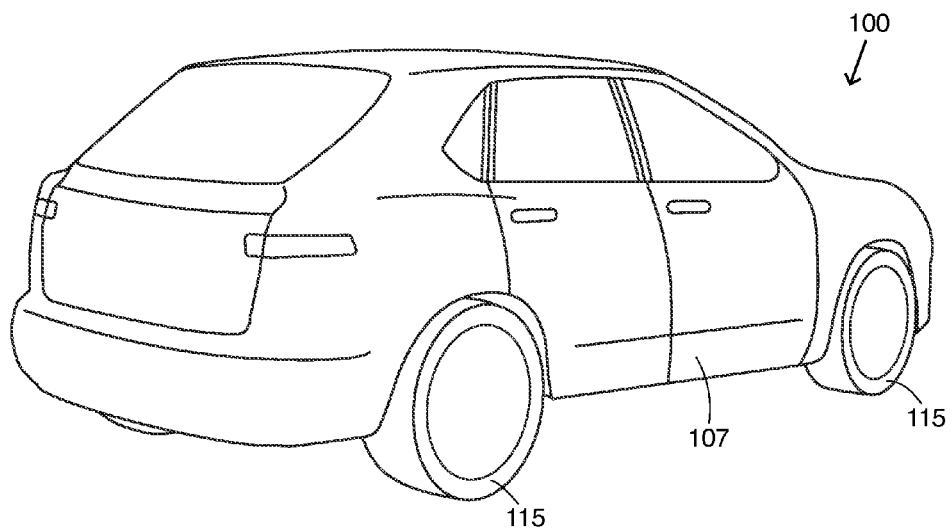
FIG. 4 is a rear side perspective view of a vehicle where the retractable side skirts are deactivated, in accordance with yet another embodiment of the disclosure.
Figure 5:
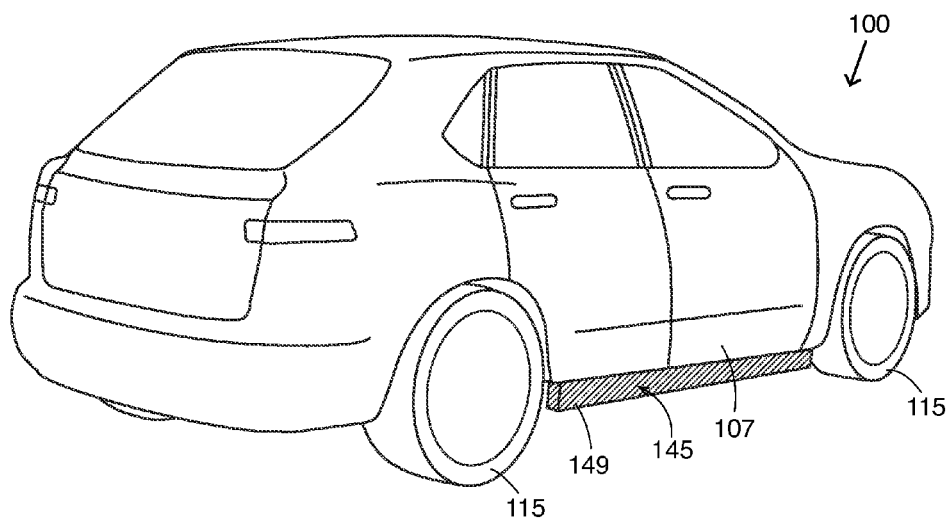
FIG. 5 is a rear side perspective view of the vehicle of FIG. 4 where the retractable side skirts are activated, in accordance with one embodiment of the disclosure.

FIG. 4 depicts vehicle 100 in one embodiment of the instant disclosure with side skirts 145 deactivated and not exposed, thus not visible from the side of the vehicle 100. FIG. 5 depicts the same vehicle 100 of FIG. 4, where side skirts 145 are activated and can be visible from the side of the vehicle 100. Depending on where these side skirts 145 are disposed on the undercarriage in relation to the wheel well 130 as discussed earlier with respect to FIGS. 2 and 3, the outer-facing wall 149 of extended side skirts 145 may or may not be fully visible from the side of the vehicle.

Figure 6:
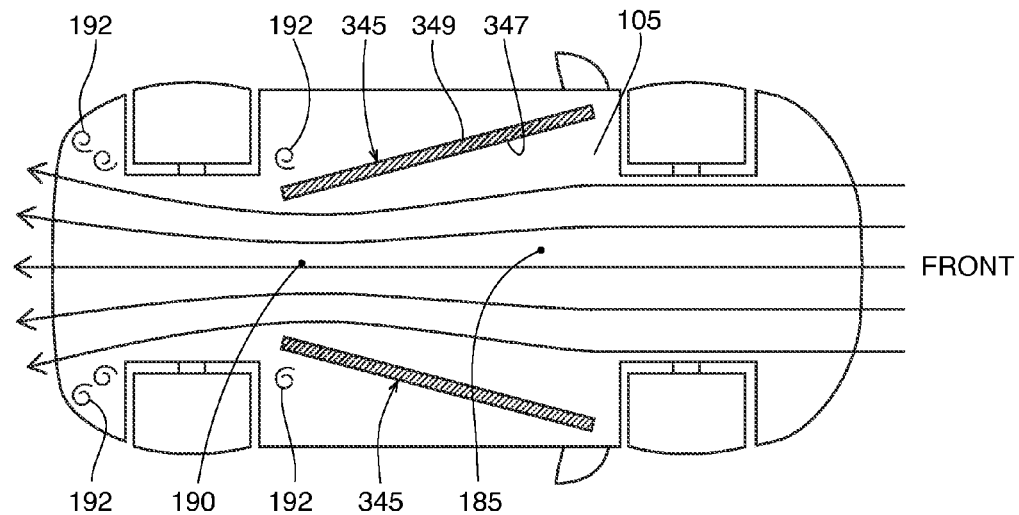
FIG. 6 is a bottom view of another vehicle implementing a pair of retractable side skirts in accordance with yet another embodiment of the disclosure where the side skirts are straight and positioned at an angle.
Figure 7:
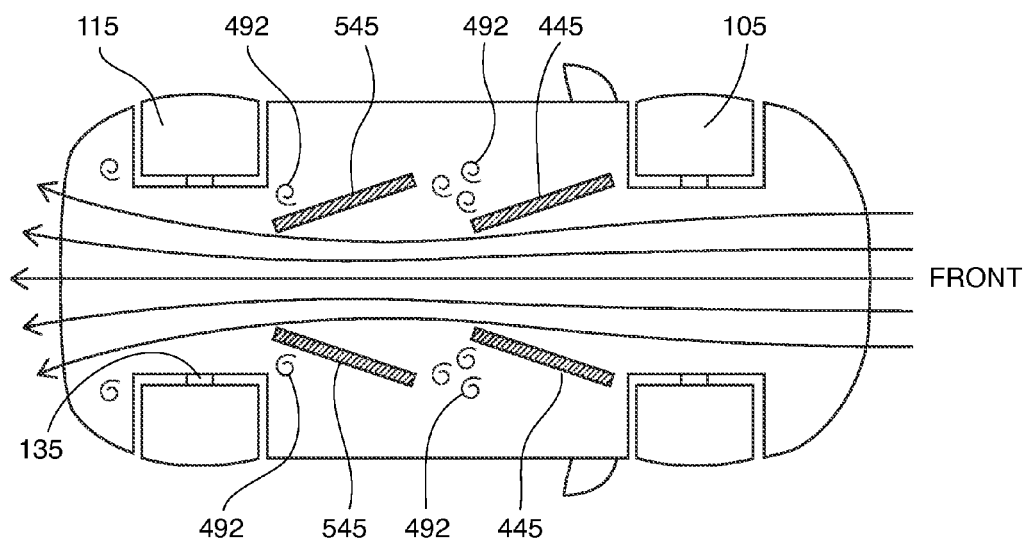
FIG. 7 is a bottom view of yet another vehicle implementing two pairs of retractable side skirts in accordance with a further embodiment of the disclosure where the side skirts are straight and positioned at an angle.

FIGS. 6 and 7 illustrate other embodiments of the side skirts where the side skirts are generally straight, disposed at a fixed angle relative to the vehicle's longitudinal axis. FIG. 6 depicts driver-side and passenger-side skirts 345 that can each have a straight structure protruding from the undercarriage 105 of the vehicle 100. Each side skirt 345 can have an inner-facing wall 347 and an outer-facing wall 349. The two side skirts 345 can be disposed generally lengthwise along the vehicle's longitudinal axis, but they are at a fixed angle to form a converging section 185, a throat section 190 and no diverging section. One skilled in the art would recognize that even though the side skirts 345 do not have guiding walls or any other structures to form a diverging section, airflow downstream from the throat section 190 can diverge regardless. And with the abrupt end to the skirt 345 without structurally creating a diverging section, vortices 192 can appear as high speed airflow rolls up in the mixing layer downstream of the skirt 345. These vortices 192 may contribute to drag reduction and/or act as a sealing wall between two different airflow zones.

Similar to other embodiments disclosed herein, side skirts 345 can be moved by actuators (not shown) which can activate these side skirts 345 by either extending them in a downward direction toward the ground, or pivoting them from a position flat against the undercarriage 105 to being perpendicular to the undercarriage 105.

FIG. 7 illustrates an array of side skirts 445, 545 that may act as flow restrictors and vortex generators. As described above for FIG. 6, side skirts 445 and 545 can create vortices 492 that block some air to the rear tires 115 for an ancillary drag reduction. Each skirt pair in the array can have individual geometric characteristics. The skirts 445 and 545 can be separately modulated and governed by the same hardware and controller as described in the earlier embodiments.

While the converging angle of the side skirts 345, 445, 545 in FIGS. 6 and 7 are fixed, further contemplated embodiments provide necessary controllers and associated hardware actuators to change the converging angle of the skirt 345, 445, 545 relative to the longitudinal center line of the undercarriage 105. As one of ordinary skill in the art would immediately recognize, changing the converging angle of side skirts 345, 445, 545 can affect the amount of downforce to specific regions. The vehicle 100 can be equipped with necessary electronic and computational components to actively change the converging angle in response to vehicle speed, road condition, traction, and even weight distribution on the vehicle 100 due to passengers and cargos. For example, if the vehicle 100 in FIG. 7 detects a front-heavy weight distribution, then the vehicle 100 can automatically shift the center of downforce toward the rear of the vehicle 100 by straightening the front pair of side skirts 445, thereby only using the rear pair of side skirts 545 to create a throat section 190 near the rear axle 135. In this way, downforce is enhanced in the rear of the vehicle 100 to compensate the heavier weight in the front of the vehicle 100.

Thus far various embodiments have been disclosed herein where active side skirts 145, 245, 345, 445, 545 are implemented to restrict a width of airflow passing under the vehicle 100 to create the Venturi effect. In some embodiments, they can form an air channel where cross sections of the end sections are larger than cross sections of the mid-portion of the air channel. The following embodiments now refer to structures, active or passive, that restrict a height of airflow passing under the vehicle 100 to create the Venturi effect.

Figure 8A:
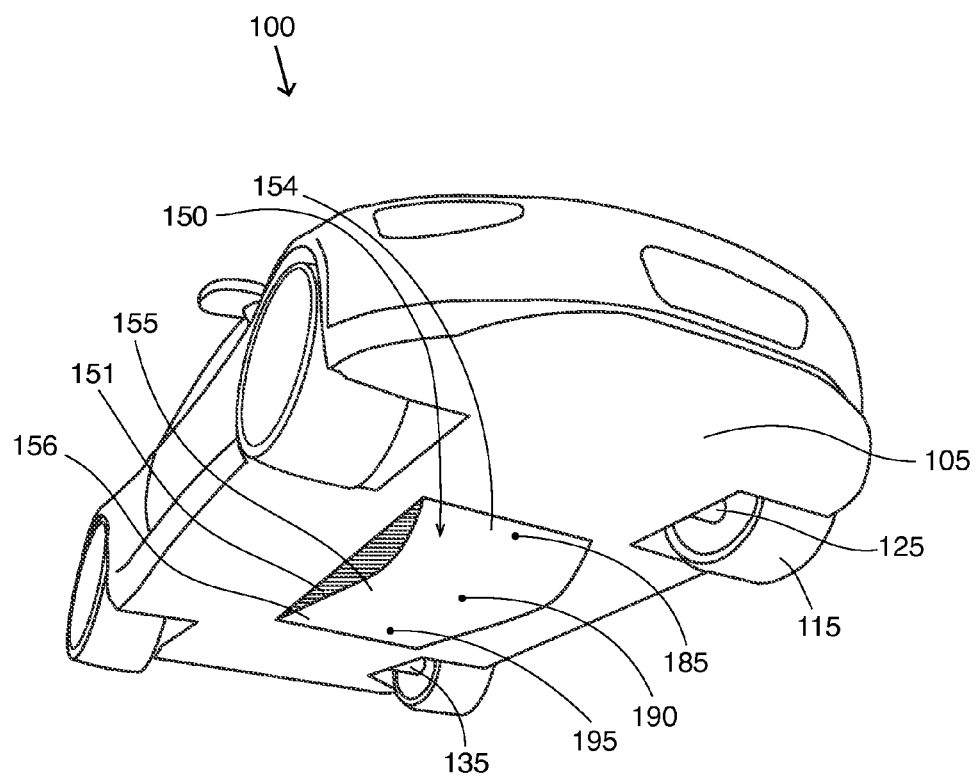
FIG. 8A is a bottom front perspective view of a vehicle's undercarriage having an underbody panel in accordance with one embodiment of the disclosure.

FIG. 8A depicts one embodiment of the vehicle ground effect system implementing an underbody panel 150 providing a downward-protruding airflow obstruction at the undercarriage 105 of vehicle 100. The contemplated underbody panel 150 is located between the front axle 125 and the rear axle 135. FIG. 8A shows a simplified version of underbody panel 150 having side wall 151 and a width that is more than 50% of the distance between the two front tires. From looking at the arc shape of the side wall 151, one skilled in the art would immediately recognize that panel 150 can have a gradual downward contour starting from its front end 154 toward its apex 155. And then the panel 150 can have a gradual upward contour starting from its apex 155 toward its rear end 156.

As those of ordinary skill in the art will recognize, the shape of the underbody panel 105 described may readily be modified as dictated by the aesthetic or aerodynamic needs of particular applications.

In an alternative embodiment, the underbody panel 150 is stationary and does not move or extend in response to activating conditions.

In contemporary vehicles with electrified propulsion, a battery pack may be placed under the floor or undercarriage of a vehicle. The battery pack may be housed in some rigid support structure. In some further embodiments of the instant disclosure, these rigid support structure(s) doubles as the reaction structure to aerodynamic loads from the underbody panel 150 attached to this structure. Undercarriage mounted vehicle battery pack and the surrounding structures therefore naturally lend themselves to a good foundation for this particular embodiment. In yet another embodiment, the underbody panel 150 is a covering panel disposed over an undercarriage-mounted battery pack in an electric or hybrid vehicle. In yet a further embodiment, the underbody panel 150 is the outer contour of the battery pack itself.

Other contemplated underbody panels 150 can be active and reactive that similarly operates as described for side skirts 145, 245, 345 above. For example, vehicle 100 can have the necessary hardware (actuator, motor, control arm, etc.) to retract panel 150 up toward the undercarriage of the vehicle and thus stay clear of undercarriage airflow. These necessary pieces of hardware can be controlled by the controller in response to activating conditions detected by sensors (or by other ways vehicles typically gather information) to extend panel 150 downward toward the ground, thereby intentionally causing airflow obstruction.

In one embodiment, the apex 155 of the underbody panel 150 can lower the height of the undercarriage airflow by 5% or above, when compared to the height of the undercarriage airflow before the airflow passes the front end of the underbody panel. In an alternative embodiment, the apex 155 can lower the height of the undercarriage airflow by 10% or above. In other embodiments, this percentage can be between 5-45%; or 10-40%; or 14-35%.

Still further contemplated embodiments can implement any of the retractable side skirts 145, 245, 345, 445, 545 in combination with a stationary underbody panel 150 as shown in FIGS. 8B, 8C, 8D, 9 and 10.

Figure 8B:
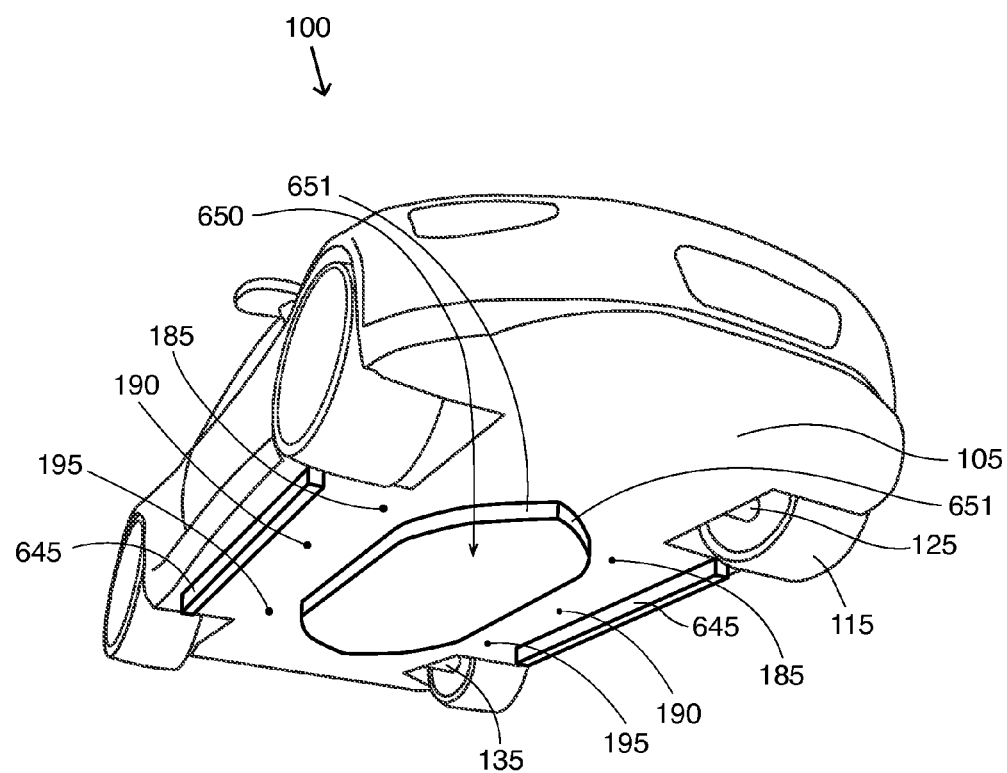
FIG. 8B is a bottom front perspective view of a vehicle's undercarriage having an underbody panel and two side skirts in accordance with another embodiment of the disclosure.
Figure 8C:
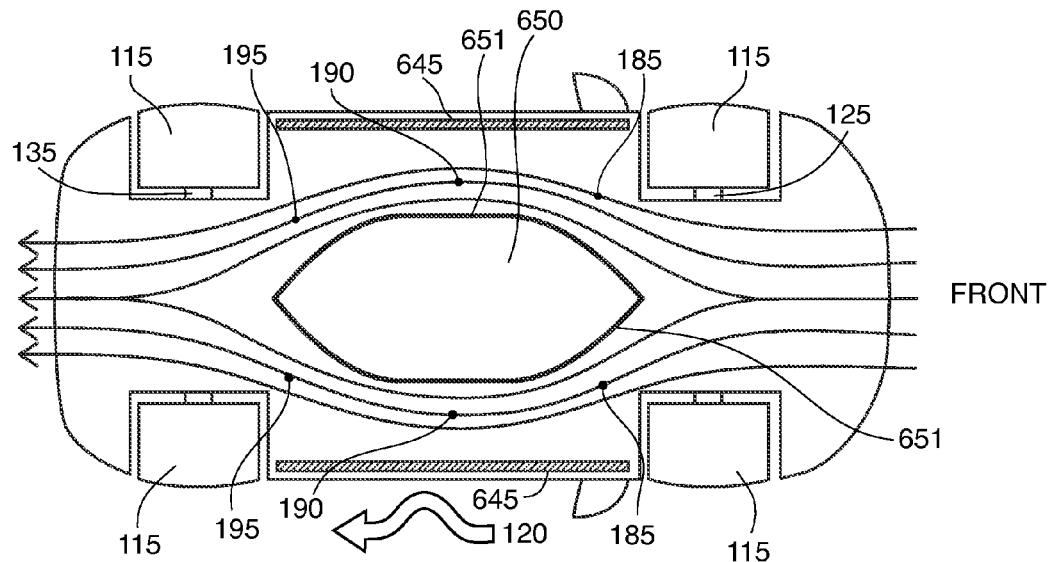
FIG. 8C is a bottom view of the vehicle of FIG. 8B.

In FIG. 8B, underbody panel 650 can have a flat bottom with two arcuate side walls 651. This underbody panel 650 can be disposed between two retractable side skirts 645. Underbody panel 650 can be a cover for undercarriage battery packs. FIG. 8C shows the embodiment of FIG. 8B in more detail. When retractable side skirts 645 are activated, the inner-facing walls of side skirts 645 can form two airflow channels with the two arcuate side walls 651 of underbody panel 650. As airflow passes under the car 100, some would pass beneath the underbody panel 650, some would pass to the left of the underbody panel 650, and some would pass to the right of the underbody panel 650. Arcuate side walls 651 are curved such that when the side skirts 645 are activated, two converging sections 185, two throat sections 190, and two diverging sections 195 can be created.

Figure 8D:
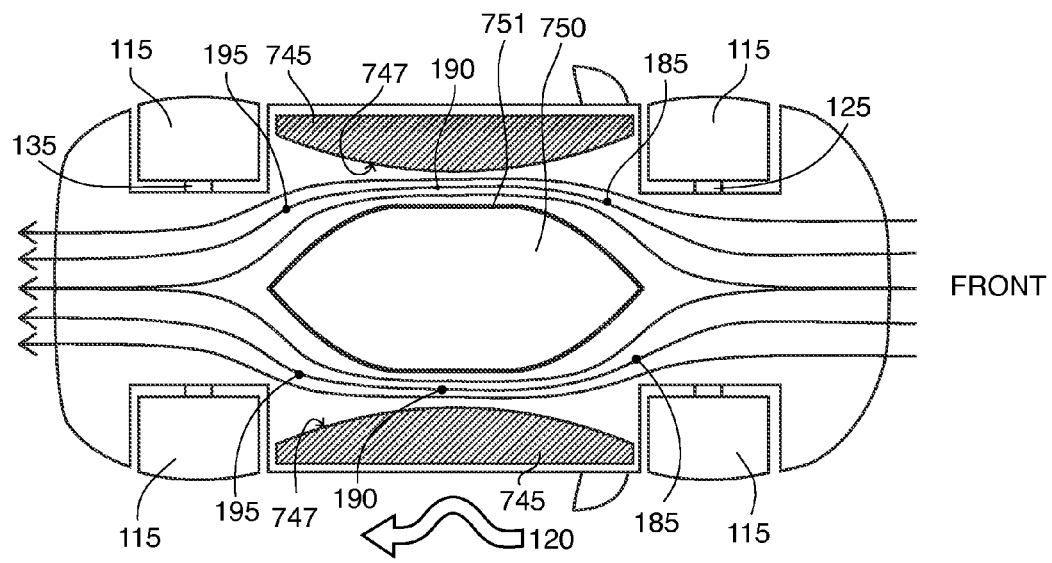
FIG. 8D is a bottom view of yet another vehicle implementing one pair of retractable side skirts with an underbody panel in accordance with a further embodiment of the disclosure.

In FIG. 8D, the vehicle can have a underbody panel 750 similar to that shown in FIG. 8C, and a pair of retractable side skirts can have arc-shaped walls 747. This underbody panel 750 can be disposed between two retractable side skirts 745. When retractable side skirts 745 are activated, the inner-facing arc-shaped walls 747 can form two airflow channels with the two arcuate side walls 751 of underbody panel 750. As airflow passes under the vehicle 100, some would pass beneath the underbody panel 750, some would pass to the left of the underbody panel 750, and some would pass to the right of the underbody panel 750. Arcuate side walls 751 are curved such that when the side skirts 745 are activated, two converging sections 185, two throat sections 190, and two diverging sections 195 can be created.

Figure 9:
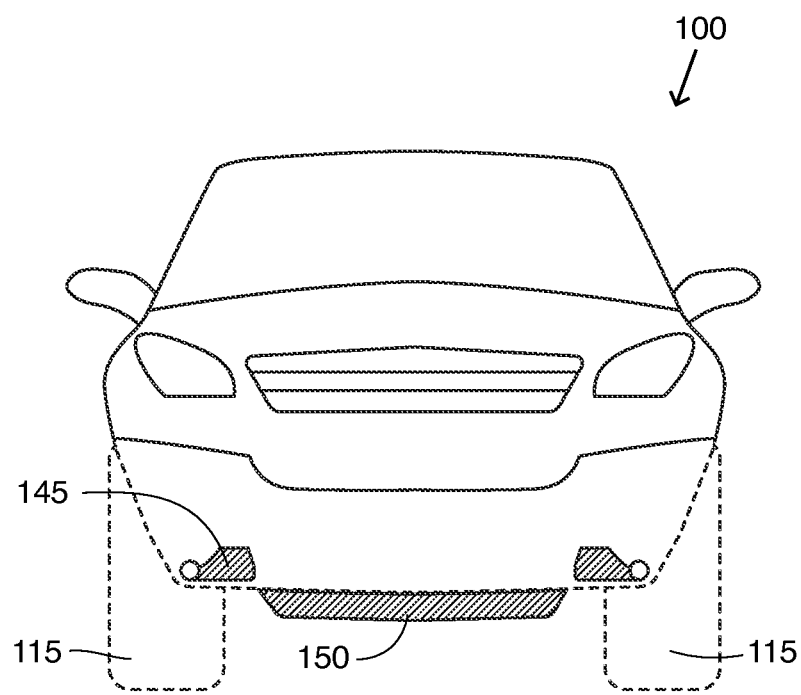
FIG. 9 is a front view of a vehicle having an underbody panel and side skirts in a deactivated state; only a cross-sectional area of the side skirt is shown.
Figure 10:
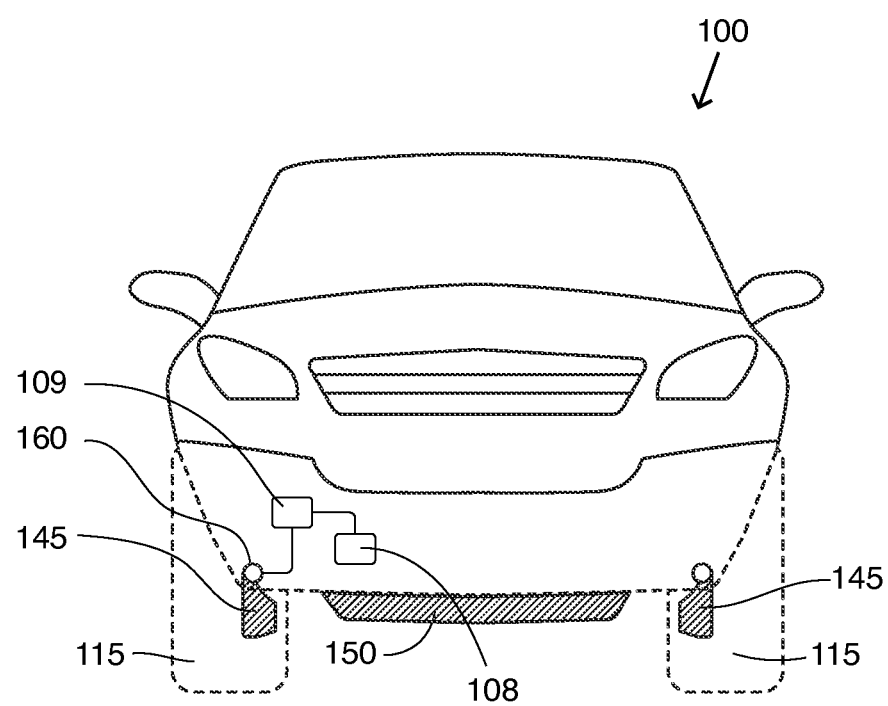
FIG. 10 is a front view of the vehicle in FIG. 9 where the side skirts are activated.

In FIG. 9, deactivated side skirts 145 are folded against the undercarriage 105, or are retracted within the undercarriage 105. In FIG. 10, vehicle 100 has an information gathering module (e.g., a sensor, a terrain-reading camera) 108 that gathers necessary data and sends these data to controller 109 to determine whether an activating condition has been met. Once an activating condition is met, the controller 109 activates actuators 160 which pivot side skirts 145 toward the ground.

Throughout the disclosure a throat section 190 has been discussed. The contemplated of throat section 190 can have a width that is at or above 80% of the width between two front ends 144 of the side skirts, or between two front ends of opposing walls defining the converging section 185. Alternatively, this percentage can be between 75% to 90%. In other embodiments, this percentage can be between 70% to 80%.

As already discussed above, any of the retractable side skirts 145, 245, 345, 445, 545, 645, 745 can operate in combination with an active and movable underbody panel 150, 650, 750. Movement of the side skirts and the underbody panel 150, 650, 750 can be done in sync or separately. In one embodiment, the underbody panel 150 is modulated by hardware and controller, which is governed by algorithms that account for speed.

Alternatively or additionally, the controller can implement inputs from terrain cameras and software logic to quickly restore some ground clearance by momentarily reducing the flow obstruction to prevent underbody-to-terrain collisions.

The aforementioned airflow guiding pieces (i.e., side skirts 145, 245, 345, 445, 545 and underbody panels 150) have been disclosed with a fixed outer shape. That is, these airflow guiding pieces each of which has a specific shape, and the pieces retain their shape whether the pieces are deployed or retracted. In a further contemplated embodiment, any of these guiding pieces can be replaced or augmented by using pliable materials and underlying frames movable by actuators which are governed by a controller. For instance, instead of using an underbody panel 150 made of rigid material, the underbody panel 150 is made of an underlying framework enveloped in the pliable material. By actively controlling the movement and shapes of the underlying frame, one can effectively change the outer contour of this particular underbody panel 150. The controller can also selectively change the location of the throat section by shifting the contraction fore or aft to modify aerodynamic distribution of front-to-rear tire loading.

The pliable or flexible material can be made of suitable materials to withstand weather and temperature extremes. Such materials include natural and synthetic polymers, various metals and metal alloys, naturally occurring materials, textile fibers, and all reasonable combinations thereof.

In further contemplated embodiments of the present disclosure, shape-changing or shape-shifting material can also be used in any of the aforementioned embodiments. The shape-changing aspect of the disclosure is enabled by hardware comprised of motors and actuators governed by a vehicle dynamic control algorithm in a controller. Shape-changing or smart materials are materials that have one or more properties that can be significantly changed in a controlled fashion by external stimuli, such as stress, temperature, moisture, pH, electric or magnetic fields.

Additionally, the disclosure includes methods of improving vehicle traction by creating a down-force using any combination of guiding pieces discussed above via any of the processes and structures already discussed.

In one embodiment, the contemplated method includes a step of monitoring a velocity of a vehicle. The monitoring step can include using various sensors and processors as one of ordinary skill would immediately understand. Contemplated method also includes a determining step to determine an activation condition is met according to the velocity of the vehicle. When the condition is met, a processor can generate and transmit a signal to an actuator to activate at least one of the airflow guiding pieces as described above. In one embodiment, the actuator activates the at least one airflow guiding piece from a first position to a second position, and the at least one guiding piece can have a contour capable of creating a Venturi effect by creating a throat section for the airflow at the second position.

The contemplated first position can be a retracted position where the airflow guiding piece is retrieved or pivoted up toward the vehicle body.

There is additionally a monitoring step to monitor road conditions, weather conditions, tire traction conditions, weight distribution conditions. Data collected regarding any of these conditions can be processed by the processor and the process can transmit a signal to change or deactivate the airflow guiding pieces.

In some embodiments of the contemplated method includes yet another monitoring step to monitoring a velocity of a vehicle using various sensors and processors as one of ordinary skill would immediately understand. Contemplated method also includes a determining step to determine a deactivation condition is met according to the velocity of the vehicle. When the deactivating condition as discussed above is met, a processor can generate and transmit a signal to an actuator to deactivate at least one of the airflow guiding pieces as described above.

Thus, specific embodiments and applications of active vehicle skirt panel have been disclosed. It should be apparent, however, to those skilled in the art that many more modifications besides those already described are possible without departing from the concepts disclosed herein.

What is claimed is:

1. An active vehicle ground effect system, comprising:
   at least one guiding piece coupled to an undercarriage of a vehicle having a configuration to guide an airflow between the undercarriage of the vehicle and a ground while the vehicle is moving;
   an actuator coupled to the at least one guiding piece;
   a controller configured to activate the at least one guiding piece from a first position to a second position, when an activating condition is met;
   wherein the controller deactivates the at least one guiding piece by actuating the actuator from the second position to the first position, when a deactivating condition is met; and
   wherein the at least one guiding piece is disposed under the vehicle between a front axle and a rear axle of the vehicle;
   wherein the at least one guiding piece includes:
      a driver-side skirt coupled to the undercarriage of the vehicle and oriented lengthwise in relation to the vehicle, and
      a passenger-side skirt coupled to the undercarriage of the vehicle and oriented lengthwise in relation to the vehicle; and wherein the driver-side skirt and the passenger-side skirt are disposed, at least partially, inboard a most inboard extent of a front wheel well and a rear wheel well of the vehicle.

2. The active vehicle ground effect system as recited in claim 1, wherein when the at least one guiding piece is activated, said at least one guiding piece is configured to form a part of a converging section and a throat section to create a Venturi-effect for the airflow.

3. The active vehicle ground effect system as recited in claim 2, wherein the activating condition includes when the vehicle travels at or above an activating threshold velocity, and wherein the deactivating condition includes when the vehicle travels at or below a deactivating threshold velocity.

4. The active vehicle ground effect system as recited in claim 3, wherein when the at least one guiding piece is activated, the at least one guiding piece is configured to be a part of a diverging section which widens a width of the airflow after the airflow has first converged in the throat section.

5. The active vehicle ground effect system as recited in claim 3, wherein the at least one guiding piece is disposed outboard just below a rocker panel of the vehicle.

6. The active vehicle ground effect system as recited in claim 3, comprising an underbody panel which is a battery cover or an outer casing of an undercarriage-mounted battery, and the underbody panel is configured to be a part of the converging section and the throat section.

7. The active vehicle ground effect system as recited in claim 6, wherein the underbody panel is retractable, and is controlled by the controller based on the activating and deactivating conditions.

8. The active vehicle ground effect system as recited in claim 6 comprising the driver-side skirt, the passenger-side skirt, and the underbody panel disposed between the driver-side skirt and the passenger-side skirt, and wherein the underbody panel has at least one of a lateral arc-shaped wall and a gradual downward contour.

9. The active vehicle ground effect system as recited in claim 6, wherein when the at least one guiding piece is activated, said at least one guiding piece has an arc-shaped wall to converge the airflow toward a center longitudinal axis of the airflow, thereby narrowing a width of the airflow at the throat section as the airflow passes between the front axle and the rear axle.

10. The active vehicle ground effect system as recited in claim 3, wherein the deactivating condition includes when a road obstacle is detected in front of the vehicle by a sensor or a terrain-reading camera.

11. A vehicle having a ground effect system disposed in an undercarriage of the vehicle, the vehicle comprising:
a front axle;
a rear axle;
a driver-side skirt coupled to the undercarriage and configured to move from a first position to a second position;
a passenger-side skirt coupled to the undercarriage and configured to move from a third position to a fourth position;
an underbody panel disposed in the undercarriage and between the driver-side skirt and the passenger-side skirt; and
wherein the driver-side skirt and the passenger-side skirt are disposed, at least partially, inboard a most inboard extent of a front wheel well and a rear wheel well of the vehicle.

12. The vehicle as recited in claim 11 further comprising a controller to move the driver-side skirt from the first position to the second position and the passenger-side skirt from the third position to the fourth position when the vehicle is traveling at or above an activating velocity.

13. The vehicle as recited in claim 11, wherein at least one of said driver-side skirt and passenger-side skirt has a wall configured to guide the airflow to converge toward a center longitudinal axis of the airflow.

14. The vehicle as recited in claim 11, wherein the underbody panel has a wall configured to guide the airflow to converge toward a center longitudinal axis of the airflow.

15. A method of improving vehicle traction, comprising:
monitoring a velocity of a vehicle;
determining an activation condition is met according to the velocity of the vehicle;
generating and transmitting a signal to an actuator to activate at least one airflow guiding piece coupled to a body of the vehicle,
wherein the actuator activates the at least one airflow guiding piece from a first position to a second position, and wherein the at least one guiding piece includes:
a driver-side skirt coupled to the undercarriage of the vehicle and oriented lengthwise in relation to the vehicle, and
a passenger-side skirt coupled to the undercarriage of the vehicle and oriented lengthwise in relation to the vehicle; and
wherein the driver-side skirt and the passenger-side skirt are disposed, at least partially, inboard a most inboard extent of a front wheel well and a rear wheel well of the vehicle.

16. The method of improving vehicle traction as recited in claim 15 wherein the first position is a retracted position.

17. The method of improving vehicle traction as recited in claim 16, wherein the throat section is formed by two of said airflow guiding pieces.

18. The method of improving vehicle traction as recited in claim 17, wherein the throat section is formed between the at least one airflow guiding piece and a side wall of an underbody panel.

* * * * *